United States Patent
Van Drentham Susman et al.

(10) Patent No.: US 7,944,073 B2
(45) Date of Patent: May 17, 2011

(54) POWER GENERATOR AND TURBINE UNIT

(75) Inventors: Hector Fillipus Alexander Van Drentham Susman, Aberdeen (GB); Kenneth Roderick Stewart, Aberdeen (GB); Donald Stewart, Ross-Shire (GB)

(73) Assignee: Rotech Holdings Limited, Aberdeen (GB)

( * ) Notice: Subject to any disclaimer, the term of this patent is extended or adjusted under 35 U.S.C. 154(b) by 80 days.

(21) Appl. No.: 12/029,341

(22) Filed: Feb. 11, 2008

(65) Prior Publication Data
US 2009/0179425 A1 Jul. 16, 2009

Related U.S. Application Data

(63) Continuation of application No. 10/491,708, filed as application No. PCT/GB02/04513 on Oct. 4, 2002.

(30) Foreign Application Priority Data

Oct. 4, 2001 (GB) .................................. 0123802.1

(51) Int. Cl.
F03B 13/10 (2006.01)
(52) U.S. Cl. ................................. 290/54; 290/43; 415/7
(58) Field of Classification Search ...................... 290/54
See application file for complete search history.

(56) References Cited

U.S. PATENT DOCUMENTS

| 1,350,187 | A | 8/1920 | Streibich et al. |
|---|---|---|---|
| 2,366,732 | A | 1/1945 | Kalix |
| 2,634,375 | A | 4/1953 | Guimbal |
| 3,986,787 | A | 10/1976 | Mouton, Jr. et al. |
| 4,149,092 | A | 4/1979 | Cros |
| 4,159,188 | A | 6/1979 | Atencio |
| 4,163,904 | A | 8/1979 | Skendrovic |
| 4,219,303 | A | 8/1980 | Mouton, Jr. et al. |
| 4,224,527 | A | 9/1980 | Thompson |
| 4,261,171 | A | 4/1981 | Atencio |
| 4,275,989 | A | 6/1981 | Gutierrez Atencio |
| 4,289,971 | A | 9/1981 | Ueda |
| 4,320,304 | A | 3/1982 | Karlsson et al. |
| 4,352,989 | A | 10/1982 | Gutierrez Atencio |
| 4,383,182 | A | 5/1983 | Bowley |
| 4,468,153 | A | 8/1984 | Gutierrez Atencio |
| 4,511,806 | A | 4/1985 | May |
| 4,804,855 | A | 2/1989 | Obermeyer |
| 5,281,856 | A | 1/1994 | Kenderi |
| 5,440,176 | A | 8/1995 | Haining |
| 7,661,922 | B2 * | 2/2010 | Belinsky ...................... 415/4.3 |
| 7,768,145 | B2 * | 8/2010 | Susman et al. ................... 290/54 |
| 2005/0001432 | A1 | 1/2005 | Susman et al. |

(Continued)

FOREIGN PATENT DOCUMENTS

GB 362223 12/1931

(Continued)

*Primary Examiner* — Joseph Waks
(74) *Attorney, Agent, or Firm* — Tarolli, Sundheim, Covell & Tummino LLP

(57) ABSTRACT

A power generator includes at least one underwater turbine unit providing a housing having a flow channel therethrough and at least one turbine means mounted in the flow channel for rotation in response to water flow through the flow channel. The turbine unit provides a turbine unit part releasably mountable in the turbine unit. The turbine unit part includes at least one of the at least one turbine means and a pump means. The turbine unit part is releasably mountable through an aperture in a side wall of the housing.

39 Claims, 5 Drawing Sheets

U.S. PATENT DOCUMENTS

2008/0265583 A1 * 10/2008 Thompson .................... 290/54

FOREIGN PATENT DOCUMENTS

| | | |
|---|---|---|
| GB | 2 195 717 A | 4/1988 |
| GB | 2 302 348 A | 1/1997 |
| GB | 2 340 892 A | 3/2000 |
| JP | 181251 | 5/1949 |
| JP | 56-132376 | 10/1981 |
| JP | 58 176478 | 10/1983 |
| JP | 62-169266 | 10/1987 |
| JP | 3-68571 | 7/1991 |
| JP | 4-47166 | 4/1992 |
| JP | 10 115278 | 5/1998 |
| RU | 2 139 972 C1 | 10/1999 |
| WO | WO 99/39098 A1 | 8/1999 |
| WO | WO 02/36964 A1 | 5/2002 |
| WO | WO 02/061273 A1 | 8/2002 |
| WO | WO 03/029645 A1 | 4/2003 |
| WO | WO 2007/055585 A1 | 5/2007 |

* cited by examiner

POWER GENERATOR AND TURBINE UNIT

RELATED APPLICATIONS

This application is a continuation of U.S. patent application Ser. No. 10/491,708, filed Aug. 13, 2004 which corresponds to PCT International Application No. PCT/GB2002/004513, filed Oct. 4, 2002 and British Application No. GB 01 23 802.1, filed Oct. 4, 2001. The subject matter of the aforementioned applications is incorporated herein by reference.

FIELD OF INVENTION

The present invention relates to a power generator and to a turbine unit. In particular, but not exclusively, the present invention relates to an electrical power generator comprising an underwater turbine unit and to an underwater turbine unit.

BACKGROUND TO INVENTION

To meet increasing energy needs, there is a general desire to develop environmentally friendly methods of generating electrical power. One particular area of interest involves the generation of power using tidal energy. This may be achieved by using underwater turbines.

Problems associated with known underwater turbines include the need to carefully seal generator assemblies provided as part of the turbine to prevent the ingress of water, and also maintenance difficulties. This is because the complete turbine must be recovered to allow maintenance to any turbine part. There have also been difficulties in optimising electrical power generation.

It is amongst objects of one or more embodiments of at least one aspect of the present invention to obviate or mitigate at least one of the foregoing disadvantages.

It is a further object of one or more embodiments of the present invention to provide an underwater turbine unit driven by tidal or current flow, and which can operate in ebb or flow tides without a need for movement or rotation into the tidal direction.

SUMMARY OF INVENTION

According to a first aspect of the present invention, there is provided a power generator comprising:

at least one underwater turbine unit including a housing having a liquid flow channel therethrough and at least one turbine means mounted in the flow channel for rotation in response to liquid flow through the flow channel.

Preferably the power generator comprises an electrical power generator.

Preferably, the flow channel defines a flow restriction.

Advantageously, this arrangement increases the velocity of liquid flowing through the flow channel in a restricted part of the flow channel, relative to an unrestricted part of the flow channel. The flow restriction preferably comprises a venturi, which may form part or the entire flow channel. In particular, the venturi may comprise a divergent-convergent-divergent venturi, tapering from openings at either end of the flow channel towards an inner part of the flow channel.

Preferably the housing is substantially symmetrical about a location of the at least one turbine means.

The venturi may comprise at least one first frusto-conical, frusto-pyramid or horn shaped body, optionally a cylindrical body, and an at least one second frusto-conical, frusto-pyramid or horn shaped body.

In one embodiment a gap is provided between a divergent end of one first/second frusto-conical, frusto-pyramid or horn shaped body and an adjacent convergent end of one further first/second frusto-conical, frusto-pyramid or horn shaped body, the divergent end of the one first/second frusto-conical, frusto-pyramid or horn shaped body being smaller in diameter than the convergent end of the one further first/second frusto-conical, frusto-pyramid or horn shaped body.

Preferably the divergent end of the one first/second frusto-conical, frusto-pyramid or horn shaped body is substantially longitudinally coincident with the convergent end of the one further first/second frusto-conical, frusto-pyramid or horn shaped body.

Preferably also, the power generator further comprises:
a pump means operatively coupled to the at least one turbine means;
a generator means driven by the turbine means and located separately from the at least one turbine unit; and
a fluid supply means coupling the pump means to the generator means for supplying fluid from the pump means to the generator assembly for generating power.

Preferably the at least one/each underwater turbine unit is adapted to be located in a body of water, eg on a floor or bed of a sea, ocean or river. Preferably also the generator means is adapted to be located outwith the body of water.

Preferably the liquid is provided from a body of water within which the turbine unit is submerged, and may be sea water. The fluid may comprise the liquid.

The turbine housing may comprise an outer housing sleeve and an inner housing sleeve, which inner sleeve may define the flow channel. Advantageously, this allows streamlining of the outer housing sleeve to reduce effects of tidal forces on the turbine unit as a whole. Alternatively, the turbine housing may comprise a single housing sleeve which may define the flow channel.

The turbine means may comprise a single stage rotor and stator combination, such as that disclosed in the Applicant's granted UK Patent No. 2 302 348, the content of which is incorporated herein by reference, or a rotor only.

Alternatively, the turbine means may comprise a multiple stage rotor and stator combination, or any other suitable turbine means. In a further alternative, the turbine means may comprise a number of turbine bodies coupled together, each including one or multiple stage rotor and stator combinations.

The pump means may be coupled to the at least one turbine means, for example, by an output shaft of the at least one turbine means. The pump means may comprise a pump as disclosed in the Applicant's co-pending PCT Patent Publication No. WO 02/36964 the content of which is incorporated herein by reference. The pump means may be mounted in the housing, preferably in the flow channel, and may be coupled directly to the turbine means. Alternatively, the pump means may be located separately from the turbine housing.

Preferably, the generator means is provided at surface, for example, at sea surface or on land. This is particularly advantageous in that it allows easy access to and maintenance of the generator means. Alternatively, the generator means may be provided underwater.

Preferably also, the generator means comprises a single generator turbine means fed by the/each of the turbine units. The generator means may comprise a generator turbine means and a generator unit. The generator turbine means may drive a generator unit directly, or through a gear mechanism, belt drive or other transmission system, to increase the speed of rotation of the generator unit relative to the generator turbine means. The generator unit may produce electrical power as either alternating current (AC) or direct current (DC), and may be controlled electronically, which may allow control of output characteristics. The generator turbine means may comprise a pelton wheel or other suitable turbine means, operatively coupled to the generator. Preferably, the generator turbine means is driven by the same liquid as the turbine means of the underwater turbine unit. Advantageously, therefore, the provision of the pump means to supply liquid, in particular water such as seawater, to the generator assembly allows a single liquid to be used both for driving the turbine unit turbine means and the generator turbine means. Thus the generator unit of the generator means need only be sealed from the generator turbine means, and not from the surrounding environment.

Power generated by the generator means may be stored by or separately from the generator means, for example, by one or more batteries, or may be fed directly into a power system, for example, a local power system. In the latter case, synchronisation, power factor and voltage of the power generated may be regulated electronically prior to being fed into a local power distribution mains system, eg grid. The generator means may be coupled by a cable, for example, a submarine cable, to the local power distribution system.

The fluid supply means may comprise a conduit extending between the pump means and the generator means. The fluid supply means is preferably releasably coupled to at least the pump means and/or the turbine means, to allow separation and removal of one or both of the pump means and turbine means for recovery to surface.

The turbine housing is preferably secured to an underwater surface, for example, a floor or bed of a sea, ocean or river by, for example, a mounting structure, which may be substantially aligned with the direction of tidal flow. Alternatively, the turbine housing may be moveably secured to an underwater surface to allow movement to face the direction of main or tidal flow. The turbine unit may comprise a subsea turbine unit, but it will be appreciated that the turbine unit may be used in any underwater environment where a liquid flow exists, for example, in any tidal or river flow situation.

Preferably the turbine unit also provides a turbine part releasably mountable in the turbine unit, the part including at least one of the turbine means to the pump means.

According to a second aspect of the present invention, there is provided a turbine unit for use in or when used in the power generator of the first aspect of the present invention.

According to a third aspect of the present invention, there is provided a power generator comprising:

at least one underwater turbine unit including at least one turbine means for rotation in response to liquid flow and a pump means operatively coupled to the at least one turbine means;

a generator means located separately from the at least one turbine unit; and a fluid supply means coupling the pump means to the generator means for supplying fluid from the pump means to the generator means for generating power.

Preferably the at least one/each underwater turbine unit is adapted to be located in a body of water, eg on a floor or bed of sea, ocean or river. Preferably also the generator means is adapted to be located outwith the body of water.

Preferably the power generator generates electrical power.

Further preferably, the at least one turbine unit includes a housing having a flow channel therethrough, the at least one turbine means being mounted in the flow channel for rotation in response to liquid flow through the flow channel. The generator means may be located separately from the turbine housing.

Preferably the liquid is provided from a body of water within which the turbine unit is submerged, and may be eg sea water. The fluid may comprise the liquid.

Preferably the power generator comprises two or more underwater turbine units, each turbine unit including a turbine means for rotation in response to fluid flow and a pump means operatively coupled to the respective turbine means;

the generator means being located separately from the turbine units; and fluid supply means coupling each turbine unit pump means to the generator means for supplying fluid from each pump means to the generator means for generating power.

Preferably further, the generator means comprises a single generator means fed by each of the two or more turbine unit pump means. Advantageously, this allows a single generator means to be provided connected to the two or more turbine units, such that a common single generator means is provided, eg. to reduce construction and maintenance costs.

The power generator may comprise a plurality, for example, three or more turbine units, each turbine unit pump means being coupled to the generator means. Each turbine unit pump means may be coupled to the generator means by respective fluid supply means. In this fashion, fluid may be supplied separately from the pump means of each turbine unit to the remotely located generator means, where the fluid supplied by each pump may be combined into a single stream for driving, for example a generator turbine means of the generator means. Alternatively, the fluid supply means may comprise means for combining the fluid from each turbine unit pump means separately from or outside the generator means, for example, by a manifold, which may be an underwater manifold.

According to a fourth aspect of the present invention there is provided an underwater turbine unit including at least one turbine means for rotation in response to liquid flow and a pump means operatively coupled to the turbine unit means, the turbine unit also providing a turbine unit part realeasably mountable in the turbine unit, the part including at least one of the at least one turbine means and the pump means.

The turbine unit may include a housing having a liquid flow channel therethrough, the at least one turbine means mounted in the flow channel for rotation in response to liquid fluid flow through the flow channel. The turbine part may comprise a turbine housing part releasably mountable in the turbine housing.

Preferably, also the turbine part comprises both the at least one turbine means and the pump means.

Advantageously, this arrangement allows the turbine part, carrying the turbine means and the pump, to be released from the underwater turbine unit and removed or replaced, for example, for maintenance purposes. In particular, the turbine part may be recoverable to surface by releasing the part from the turbine unit.

The turbine housing may include an opening or aperture to allow access to the turbine housing part, which opening may be selectively closeable. The turbine housing may include an openable flap, door, catch, window or the like selectively closing the opening to allow access to the turbine housing part for removal. The turbine housing part may comprise a ring member which may form part of the flow channel and which may house at least part of one or both of the at least one turbine means and the pump means.

According to a fifth aspect of the present invention, there is provided a power generator comprising:

an underwater turbine unit according to a fourth aspect of the present invention;

a generator means located separately from the turbine housing; and a fluid supply means coupling the pump means to the generator means, for supplying fluid from the pump means to the generator means for generating power.

The generator means may be located separately from the turbine housing.

According to a sixth aspect of the present invention there is provided a turbine housing part for an underwater turbine unit according to the fourth aspect of the present invention.

Further features of any one or more of the power generators defined in the first, third or fifth aspects of the present invention may be shared with features of the power generators defined in any other one of the first, third or fifth aspects.

According to a seventh aspect of the present invention there is provided a method of generating electrical power using the power generator of any of the first, third or fifth aspects of the present invention.

BRIEF DESCRIPTION OF DRAWINGS

Embodiments of the present invention will now be described, by way of example only, with reference to the accompanying drawings, which are.

DETAILED DESCRIPTION OF DRAWINGS

Figure 1:
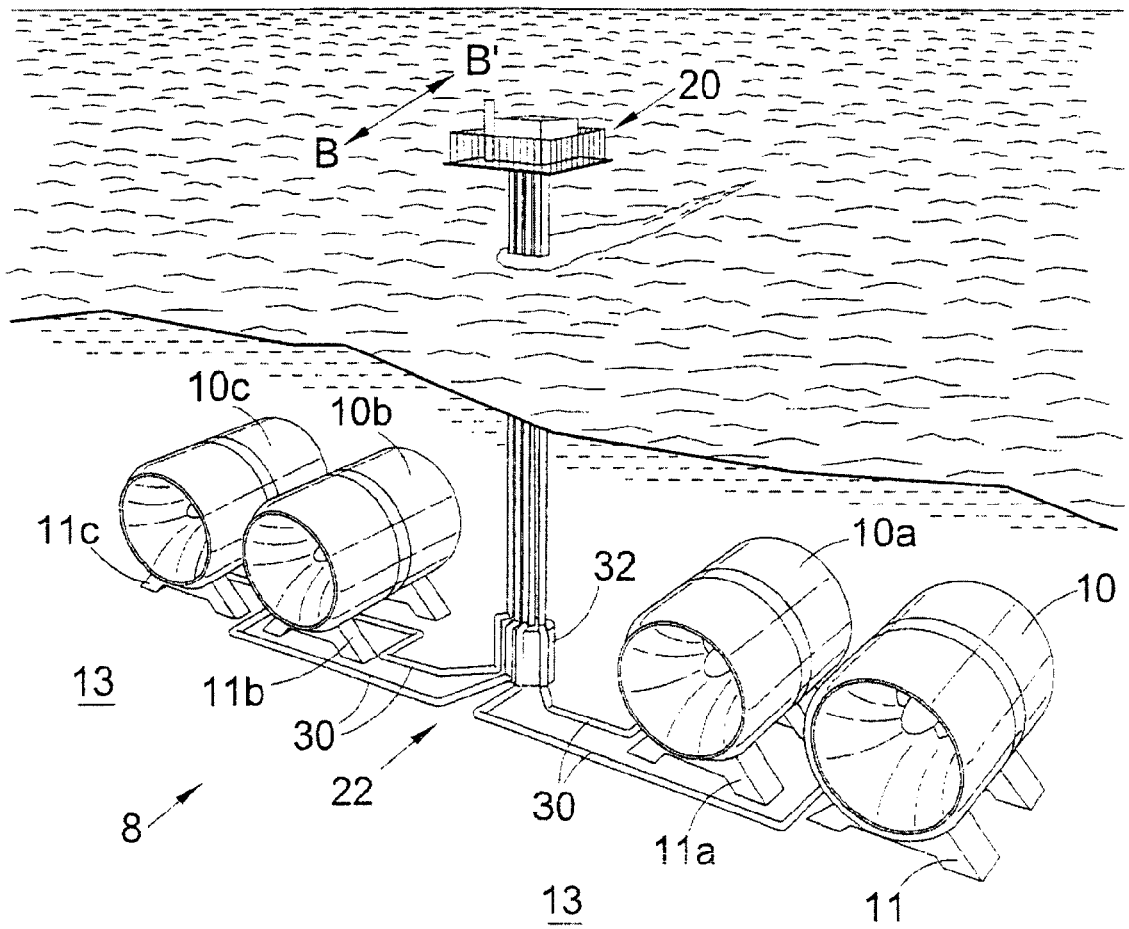
FIG. 1 a schematic, perspective illustration of a power generator in accordance with an embodiment of the present invention.
Figure 2:
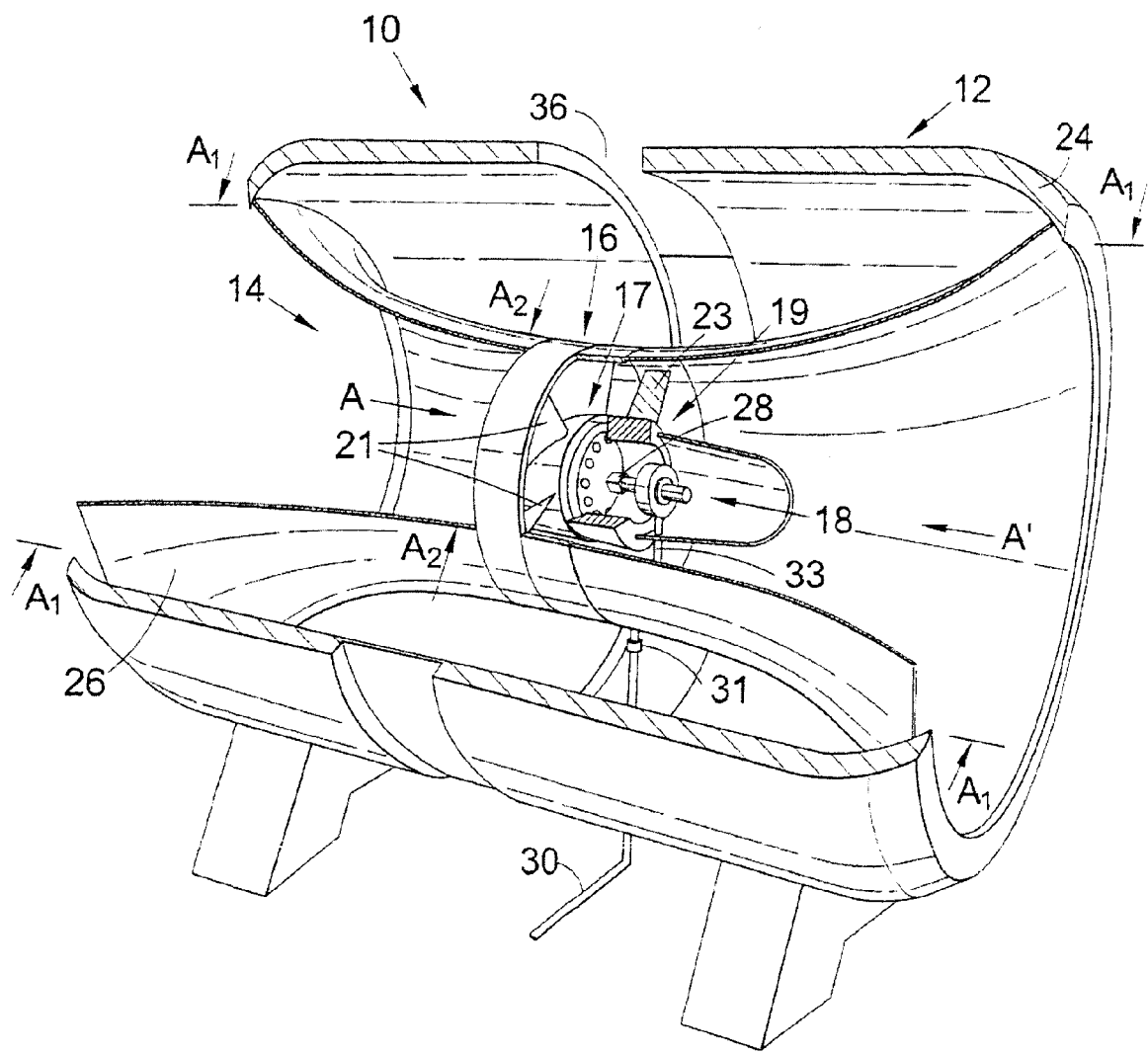
FIG. 2 an enlarged, partially sectioned view of an underwater turbine unit forming part of the power generator of FIG. 1.

Referring firstly to FIG. 1, there is shown a power generator in accordance with a first embodiment of the present invention, the power generator indicated generally by reference numeral 8. The power generator 8 generally comprises an underwater turbine unit 10, which is shown in the enlarged, partially sectioned view of FIG. 2. The turbine unit 10 includes a housing or shroud 12 having a fluid flow channel 14 therethrough, a turbine means 16 mounted in the flow channel 14, for rotation in response to liquid flow through the fluid channel 14, and a pump 18 operatively coupled to the turbine means 16. The power generator 8 also includes a generator assembly 20 (FIG. 1) located separately from the turbine housing 12, and a fluid supply means 22 coupling the pump 18 to the generator assembly 20, for supplying fluid from the pump 18 to the generator assembly 20, for generating power.

FIG. 1 illustrates an embodiment of the present invention including two or more, in particular four underwater turbine units 10, 10a, 10b and 10c. Each of the units 10a-10c are similar to the turbine unit 10 and like components share the same reference numerals. The fluid supply means 22 couples each turbine unit pump 18 to the generator assembly 20. Each of the turbine units 10-10c are mounted by respective mounting frames 11, 11a, 11b and 11c to the seabed 13 and are aligned with the main direction of tidal flow, as indicated by the arrow B-B'.

In more detail, the turbine unit housing 12 includes an outer housing sleeve 24 and an inner housing sleeve 26, which defines the fluid flow channel 14. The inner housing sleeve 26 is formed in the shape of a divergent-convergent-divergent venturi, which forms a flow restriction in the fluid flow channel 14. This has the effect of increasing the velocity of fluid flow through the flow channel 14 in the direction of the arrow A or A'. As can be seen from FIG. 1 or 2, the housing 12 is substantially symmetrical in a longitudinal direction so that the turbine unit 10 is operative in either of two substantially opposing directions.

The turbine means 16 comprises a single stage rotor 17 and stator 19 combination, similar to that disclosed in the Applicant's granted UK Patent No. 2 302 348. The rotor 17 carries a number of rotor blades 21 and the stator 19 a number of stator blades 23. The stator 19 is shown partially cut-away in FIG. 2, for illustration purposes. The pump 18 comprises a pump of the type disclosed in the Applicant's co-pending PCT Patent Publication No. WO 02/36964, and is coupled directly to the turbine means 16 by a turbine output shaft 28, for rotation with and by the turbine means 16.

The fluid supply means comprises a fluid conduit 30, which couples the pump 18 to the generator assembly 20. In this fashion, liquid flowing through the liquid flow channel 14 drives the turbine means, to rotate the rotor and thus the output shaft 28, driving the pump 18 to pump fluid to the generator assembly 20. It will therefore be noted that the driving liquid, in this case seawater, which drives the turbine means 16 is also supplied by the pump 18 to the generator assembly 20.

The generator assembly 20 is mounted on a platform 32 mounted on the seabed 13, and generally comprises a generator turbine means (not shown) such as a pelton wheel and a generator unit (not shown) coupled to the pelton wheel. The pelton wheel is thus driven by fluid supplied from the pump 18 to rotate and drive the generator unit, to generate electrical power.

In the power generator 8 shown in FIG. 1, each of the turbine units 10-10c are connected via respective conduits 30 to the generator assembly 20, such that fluid is supplied to a common generator. Mounting of the generator assembly 20 separately from the housing, in particular at the surface on the platform 32, is particularly advantageous as this both assists in maintenance of the generator assembly 20 and reduces construction and maintenance costs. This is in part because the generator assembly is provided above the sea surface, and therefore does not to be sealed against the ingress of seawater.

The generator assembly 20 is connected via submarine cable to a local onshore power grid, to feed the AC or DC electrical power generated directly into the local grid. Alternatively, the generator assembly 20 may include batteries (not shown) for storing the generated electricity.

It has been found that the turbine units 10, 10a, 10b, 10c typically have a liquid entry angle of ±25° from the longitudinal axis thereof, and therefore do not need to be aligned with ebb or flow tides.

Figure 3:
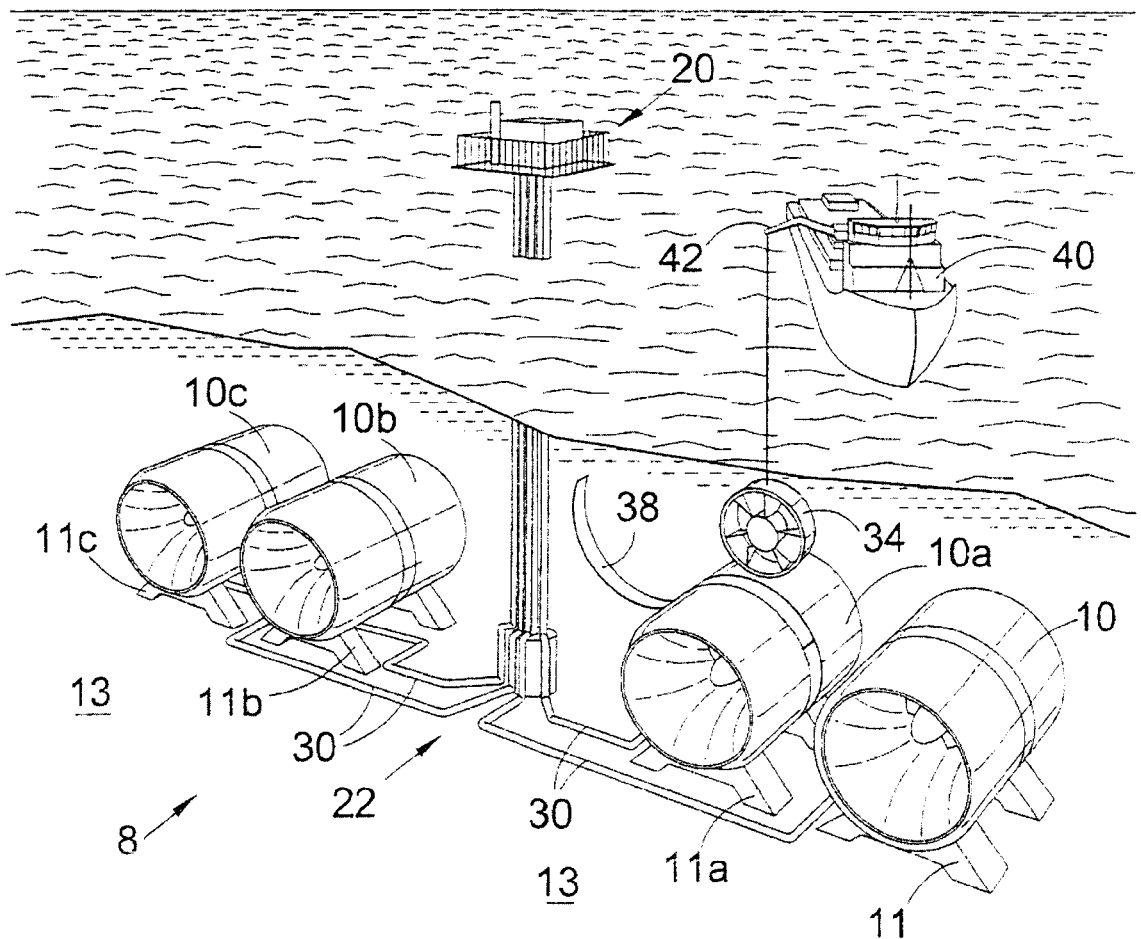
FIG. 3 a schematic, perspective illustration of a power generator during installation or maintenance in accordance with an alternative embodiment of the present invention.

Turning now to FIG. 3, a further feature of the power generator 8 of FIG. 1 is illustrated, in accordance with an alternative embodiment of the present invention.

Each turbine unit 10-10c includes a housing part 34 which is releasably mounted in the turbine housing 12. The housing part 34 carries the turbine means 16 and the pump 18, and is removable for maintenance, as illustrated in FIG. 3. To assist this operation, the outer housing part 24 of the turbine housing 12 includes an opening 36 extending partly around the outer housing sleeve 24. A hatch 38 (FIG. 3) is opened to allow access to the housing part 34. Also, the conduit 30 includes a connection 31, which couples the conduit 30 to a section 33 of conduit coupled to the pump 18. In this fashion, the housing part 34 may be removed for maintenance to the turbine means 16 and/or pump 18, following opening of the hatch 38 and release of the connection 31. FIG. 3 shows a vessel 40 on site removing the housing part 34 for maintenance, using a crane 42. This is particularly advantageous as this allows maintenance without having to remove the whole turbine unit 10 from the seabed 13.

Preliminary calculations for the power generator 8 are based on the following assumptions:

| Power to be generated, P = | 50 kW |
| Velocity of tidal current, $V_1$ = | 3 knots = 1.54 m/s |
| Inlet to throat venturi ratio, $A_1:A_2$ = | 4:1 |
| Density of sea water, □ = | 1025 kg/m³ |
| Hydraulic efficiency of turbine means propellor/rotor = | 75% |
| Efficiency of pump = | 90% |
| Efficiency of turbine means = | 85% |
| Efficiency of generator unit = | 90% |

From the above, the overall efficiency of the system is 51.64%, giving a required power at propellers Pp of the turbine units, of $$P_p = \frac{50 \text{ kW}}{0.5164} = 96.8 \text{ kW}.$$

From the theory of continuity, for an inlet to throat ratio of 4:1 and an inlet velocity of 1.54 m/s the velocity through the propeller at the throat of the venturi, $v_2$ will be $$V_2 = 4*1.54 = 6.16 \text{ m/s}.$$

The amount of power, $P_0$, available in a freely flowing fluid stream of cross-sectional area, A, is equal to this area multiplied by the velocity of the fluid stream and the kinetic energy of a unit volume of the fluid stream, and is given as:

$$P_0 = (½ \cdot □ \cdot A \cdot v_1^3)$$

Thus, the required venturi inlet area, $A_1$ is, $$A_1 = \frac{2*96830}{1025*1.54^3} = 51.7 \text{ m}^2$$

and the required venturi throat area, $A_2$ is 12.9 m². This is equivalent to a venturi inlet diameter of 8.09 m and throat diameter of 4.05 m.

At these parameters the turbine means 16 would be expected to rotate at approximately 60 rpm in a 3 knot current.

From the equation for the calculation of $P_0$ above, it is evident that the velocity of the tidal stream has a significant effect on the available power. Using the above dimensions and assumptions, the effect of small increases in tidal velocity on the power that may be extracted is given below:

| Velocity (knots | Extracted power (kW) |
| --- | --- |
| 3 | 50 |
| 4 | 118 |
| 5 | 230 |
| 6 | 397 |
| 7 | 631 |
| 8 | 942 |

(Effect of tidal velocity on power that may be extracted from a 4 m propeller and housing inlet diameter of 8 m.)

Similarly, to generate 1 MW from a current with a mean velocity of 5 knots would require turbine means blade/rotor of 8.5 diameter and a turbine housing 12 inlet of 17 m diameter.

Figure 4:
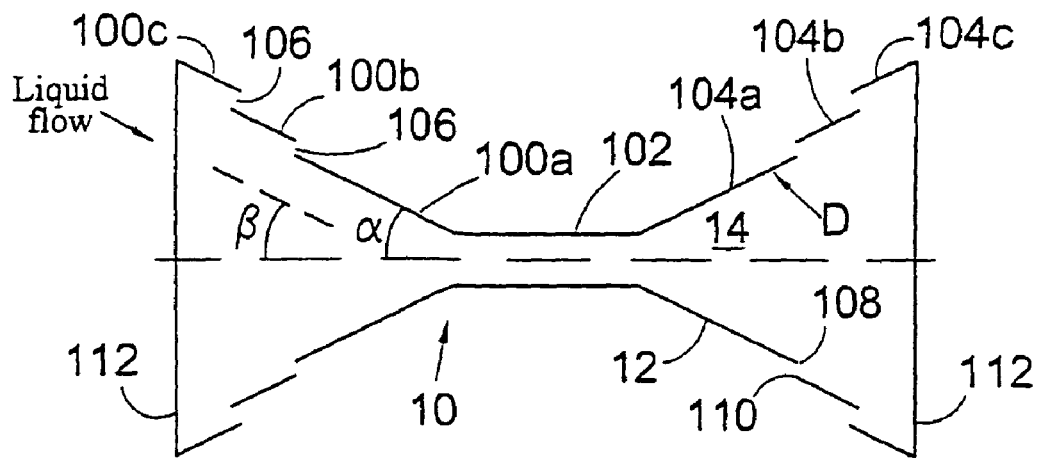
FIG. 4 a side cross-sectional view of a housing of a turbine unit forming part of a power generator in accordance with a further alternative embodiment of the present invention.

Referring now to FIG. 4, there is shown a housing 12 of a turbine unit 10 forming part of a power generator 8 in accordance with a further alternative embodiment of the present invention.

It has been found that if the liquid entry angle to the turbine unit 10 is to steep then liquid flow will separate at boundary layer D. To energise the boundary layer D and ensure liquid flow through the turbine unit 10, the venturi is adapted as described below.

As can be seen from FIG. 4, the venturi comprises at least one frusto-conical body 100a,100b,100c a cylindrical body 102 and an at least second frusto-conical body 104a,104b, 104c.

In this embodiment a gap 106 is provided between a divergent end 108 of one first/second frusto-conical body 100,104 and an adjacent convergent end 110 of one further first/second frusto-conical body 100,104, the divergent end 108 of the one first/second frusto-conical body 100,104 being smaller in diameter than the convergent end 110 of the one further first/second frusto-conical body 100,104. The frusto-conical body may be straight edged or concaved inwards.

As can be seen from FIG. 4, the divergent end 108 of the one first/second frusto-conical body 100,104 is substantially longitudinally coincident with the convergent end 110 of the one further first/second frusto-conical body 100,104.

Typically the housing 12 has an overall length of around 20 m, the ends 112 of the symmetrical venturi an internal diameter of 15 to 20 m and typically around 17.5 m, the cylindrical body 102 a length of 2 m and an internal diameter of 10 m. Typically the radial size of the gap 108 is 1 m, and the further first/second frusto-conical body 100,104 has a length of 2 m.

Figure 5:
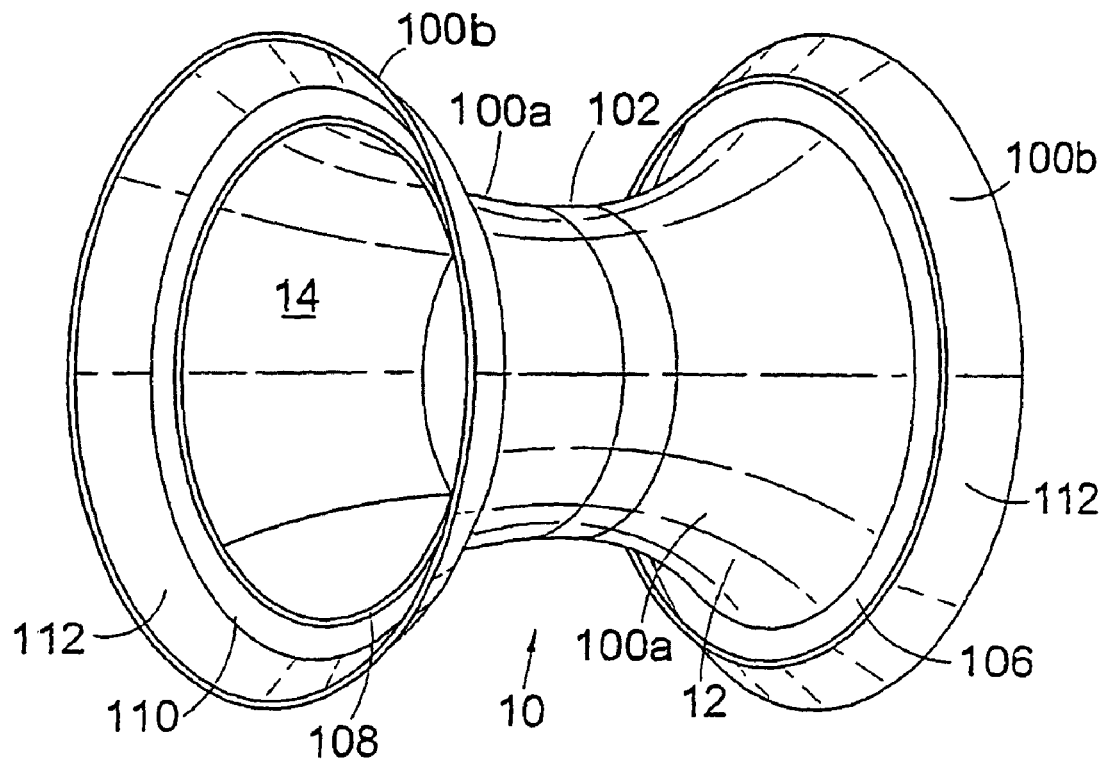
FIG. 5 a perspective illustration of a housing of a turbine unit forming part of a power generator in accordance with a still further alternative embodiment of the present invention.
Figure 6:
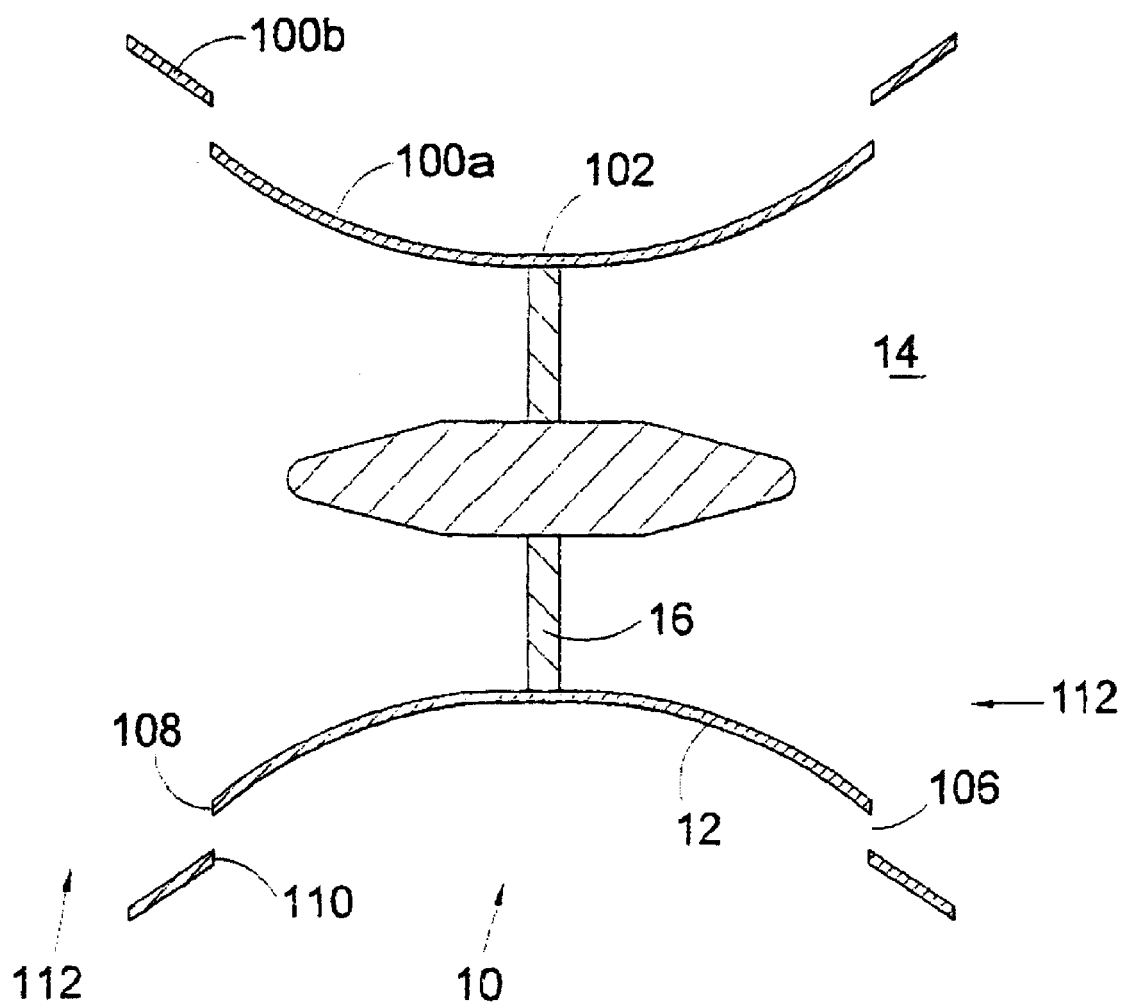
FIG. 6 a side view of a turbine unit including the housing of FIG. 5.

Referring to FIGS. 5 and 6, there is shown a housing 12 of a turbine unit 10 forming part of a power generator 8 in accordance with a still further alternative embodiment of the present invention.

In this embodiment, the venturi comprises a pair of frusto-conical bodies 100b and a pair of horn shaped bodies 100a, gaps 106 being provided between each frusto-conical body 100b, and adjacent horn shaped body 100a.

It will be appreciated that various modifications may be made to the foregoing embodiments within the scope of the present invention. For example, the fluid supply means may comprise means for combining the fluid from each turbine unit pump separately from or outside the generator assembly, for example, by a manifold, which may be an underwater manifold. The turbine housing may comprise a single housing sleeve which may define the flow channel. The turbine means may comprise a multiple stage rotor and stator combination, or any other suitable turbine means. The turbine means may comprise a number of turbine bodies couples together, each including one or multiple stage rotor and stator combinations. The pump may be located separately from the turbine housing. The turbine housing may be moveably secured to an underwater surface to allow movement to face the direction of main or tidal flow. The turbine means may include a rotor only, without a stator. Further, although in the disclosed embodiments the flow channel is advantageously of circular cross-section, other cross-sections are possible, eg oval, elliptical, square or rectangular.

The invention claimed is:

1. A power generator comprising at least one underwater turbine unit, the at least one underwater turbine unit providing:
   a housing having first and second ends, the first and second ends being provided with respective first and second openings, a liquid flow channel extending through the housing between the first and second openings, and
   at least one turbine means mounted in the flow channel for rotation in response to liquid flow through the flow channel, wherein
   the turbine unit provides a turbine unit part comprising one or both of the at least one turbine means and a pump means, the turbine unit part further comprising a member which forms at least part of the flow channel, the turbine unit part being releasably mountable in the turbine unit and removable from the housing between the first and second ends.

2. A power generator as claimed in claim 1, wherein the power generator comprises an electrical power generator.

3. A power generator as claimed in claim 1, wherein the flow channel defines a flow restriction.

4. A power generator as claimed in claim 3, wherein the flow restriction comprises a venturi.

5. A power generator as claimed in claim 4, wherein the venturi comprises a divergent-convergent-divergent venturi, tapering from openings at either end of the flow channel towards an inner part of the flow channel.

6. A power generator as claimed in claim 5, wherein the venturi comprises at least one first frusto-conical, frusto-pyramid or horn shaped body, optionally a cylindrical body, and an at least one second frusto-conical, frusto-pyramid or horn shaped body.

7. A power generator as claimed in claim 6, wherein a gap is provided between a divergent end of one first/second frusto-conical, frusto-pyramid or horn shaped body and an adjacent convergent end of one further first/second frusto-conical, frusto-pyramid or horn shaped body, the divergent end of the one first/second frusto-conical, frusto-pyramid or horn shaped body being smaller in a diameter than the convergent end of the one further first/second frusto-conical, frusto-pyramid or horn shaped body.

8. A power generator as claimed in claim 7, wherein the divergent end of the one first/second frusto-conical, frusto-pyramid or horn shaped body is substantially longitudinally coincident with the convergent end of the one further first/second frusto-conical, frusto-pyramid or horn shaped body.

9. A power generator as claimed in claim 5, wherein the at least one turbine means is provided at a narrowest position of the venturi.

10. A power generator as claimed in claim 1, wherein the housing is substantially symmetrical about a mid-point location of the at least one turbine means.

11. A power generator as claimed in claim 1, wherein the power generator further comprises:
    the pump means operatively coupled to the at least one turbine means;
    a generator means driven by the turbine means; and
    a fluid supply means coupling the pump means to the generator means for supplying fluid from the pump means to the generator means for generating power.

12. A power generator as claimed in claim 11, wherein the at least one/each underwater turbine unit is adapted to be located in a body of water and the generator means is adapted to be located outwith the body of water.

13. A power generator as claimed in claim 11, wherein, in use, the water is provided from a body of water within which the turbine unit is submerged, and the fluid comprises the water.

14. A power generator as claimed in claim 11, wherein the pump means is coupled to the at least one turbine means by an output shaft of the at least one turbine means.

15. A power generator as claimed in, claim 11, wherein the generator means is provided above the surface of the water.

16. A power generator as claimed in claim 11, wherein the generator means comprises a single generator turbine means fed by the or each of the underwater turbine units, the generator means comprising the generator turbine means and a generator unit, the generator turbine means driving the generator unit.

17. A power generator as claimed in claim 16, wherein the generator unit produces electrical power as either alternating current (AC) or direct current (DC).

18. A power generator as claimed in claim 16, wherein the generator turbine means comprises a pelton wheel operatively coupled to the generator, the generator turbine means being driven by the same liquid as the turbine means of the underwater turbine unit.

19. A power generator as claimed in claim 1, wherein the housing comprises an outer housing sleeve and an inner housing sleeve, which inner sleeve defines the flow channel.

20. A power generator as claimed in claim 19, wherein the turbine unit part comprises at least part of the inner sleeve.

21. A power generator as claimed in claim 1, wherein the turbine means is selected from:
    a single stage rotor and stator combination; a rotor only; a multiple stage rotor and stator combination; or a number of turbine bodies coupled together, each including one or multiple stage rotor and stator combinations.

22. A power generator as claimed in claim 1, wherein the pump means is mounted in the flow channel and is coupled directly to the turbine means.

23. A power generator as claimed in claim 1, wherein the turbine housing is securable to an underwater surface by a mounting structure so as to be substantially aligned with the direction of tidal flow, in use.

24. A power generator as claimed in claim 1, wherein the or each at least one underwater turbine unit is adapted to be located on or adjacent to a bottom of a body of water.

25. A power generator as claimed in claim 1, wherein the turbine unit part is removable from and installable within the turbine unit by substantially vertical movement.

26. A power generator as claimed in claim 1, wherein the turbine unit part comprises the at least one turbine means.

27. A power generator as claimed in claim 1, wherein the turbine unit part comprises the pump means.

28. A power generator as claimed in claim 1, wherein the turbine unit part comprises the at least one turbine means and the pump means.

29. A power generator as claimed in claim 1, wherein the turbine unit part comprises at least part of the housing.

30. A power generator as claimed in claim 1, wherein the housing comprises a single housing sleeve.

31. A power generator as claimed in claim 1, wherein an aperture extends through the side wall of the housing.

32. A power generator comprising at least one underwater turbine unit, the at least one underwater turbine unit providing:
- a housing having a liquid flow channel therethrough and at least one turbine means mounted in the flow channel for rotation in response to liquid flow through the flow channel wherein the turbine unit provides a turbine unit part releasably mountable in the turbine unit, the turbine part comprising one or both of the at least one turbine means and a pump means, the turbine unit part further comprising a member which forms at least part of the flow channel, wherein the power generator further comprises:
- the pump means operatively coupled to the at least one turbine means:
- a generator means driven by the turbine means; and
- a fluid supply means coupling the pump means to the generator means for supplying fluid from the pump means to the generator means for generating power, wherein the fluid supply means comprises a conduit extending between the pump means and the generator means, the fluid supply means being releasably coupled to at least one or both of the pump means and/or the turbine means to allow separation and removal of one or both of the pump means and turbine means for recovery to surface.

33. A power generator comprising at least one underwater turbine unit, the at least one underwater turbine unit providing:
- a housing having a liquid flow channel therethrough and at least one turbine means mounted in the flow channel for rotation in response to liquid flow through the flow channel, wherein the turbine unit provides a turbine unit part releasably mountable in the turbine unit, the turbine unit part comprising one or both of the eat least one turbine means and a pump means, thr turbine unit part further comprising a member which forms at least part of the flow channel, wherein the housing comprises an outer housing sleeve and an inner housing sleeve, which inner sleeve defining the flow channel, wherein the outer housing sleeve provides an opening closable by a hatch, and wherein the turbine unit part is removable for maintenance via the opening.

34. An underwater turbine unit for use in a power generator, the at least one underwater turbine unit providing:
- a housing having first and second ends, the first and second ends being provided with respective first and second openings, a liquid flow channel extending through the housing between the first and second openings, and
- at least one turbine means mounted in the flow channel for rotation in response to liquid flow through the flow channel, wherein
- the turbine unit provides a turbine unit part comprising one or both of the at least one turbine means and a pump means, the turbine unit part further comprising a member which forms at least part of the flow channel, the turbine unit part being releasably mountable in the turbine unit and removable from the housing between the first and second ends.

35. A power generator as claimed in claim 34, wherein an aperture extends through a side wall of the housing.

36. A method of generating electrical power using a power generator, the power generator comprising at least one underwater turbine unit, the at least one underwater turbine unit providing:
- a housing having first and second ends, the first and second ends being provided with respective first and second openings, a liquid flow channel extending through the housing between the first and second openings, and
- and at least one turbine means mounted in the flow channel for rotation in response to liquid flow through the flow channel, wherein
- the turbine unit provides a turbine unit part comprising one or both of the at least one turbine means and a pump means, the turbine unit part further comprising a member which forms at least part of the flow channel, the turbine unit part being releasably mountable in the turbine unit and removable from the housing between the first and second ends.

37. A power generator as claimed in claim 36, wherein an aperture extends through a side wall of the housing.

38. A power generator comprising at least one underwater turbine unit, the at least one underwater turbine unit providing:
- a housing having a liquid flow channel extending therethrough between first and second ends of the housing, the flow channel defining a flow restriction comprising a venturi,
- at least one turbine means mounted in the flow channel for rotation in response to liquid flow through the flow channel; and
- the at least one turbine means being mounted in the flow channel for rotation along an axis parallel to the flow channel; wherein
- in use, the housing is stationary and the turbine rotates in response to liquid flow through the flow channel; and wherein
- the housing is provided with a waist on an outermost exposed underwater surface thereof, the waist being narrower than the first and second ends of the housing.

39. A power generator comprising at least one underwater turbine unit, the at least one underwater turbine unit providing:
- a housing having a liquid flow channel therethrough and at least one turbine means mounted in the flow channel for rotation in response to liquid flow through the flow channel, wherein the turbine unit provides a turbine unit part releasably mountable in the turbine unit, the turbine unit part comprising one or both of the at least one turbine means and a pump means, the turbine unit part further comprising a member which forms at least part of the flow channel, wherein the turbine unit part is releasably mountable through an aperture of a side wall of a side of said housing without rotating the turbine unit.

* * * * *